United States Patent
Tehrani (10) Patent No.: US 7,031,657 B2
(45) Date of Patent: Apr. 18, 2006

(54) SAFE METHOD AND SYSTEM FOR MOBILE OR WIRELESS COMPUTING OR COMMUNICATION DEVICES

(75) Inventor: Mahin Nikmanesh Tehrani, Germantown, MD (US)

(73) Assignee: Bijan Tadayon, Potomac, MD (US)

( * ) Notice: Subject to any disclaimer, the term of this patent is extended or adjusted under 35 U.S.C. 154(b) by 476 days.

(21) Appl. No.: 10/235,567

(22) Filed: Sep. 6, 2002

(65) Prior Publication Data

US 2004/0203345 A1 Oct. 14, 2004

(51) Int. Cl.
*H04B 7/15* (2006.01)
(52) U.S. Cl. .................. 455/11.1; 455/568; 455/569
(58) Field of Classification Search ............... 455/13.3, 455/13.4, 11.1, 568, 569, 556, 573, 90
See application file for complete search history.

(56) References Cited

U.S. PATENT DOCUMENTS 6,552,686 B1 * 4/2003 Ollikainen et al. .. 343/700 MS
6,738,485 B1 * 5/2004 Boesen ........................ 381/312
6,741,215 B1 * 5/2004 Grant et al. ................. 343/702

\* cited by examiner

*Primary Examiner*—Nay Maung
*Assistant Examiner*—Michael Chu
(74) *Attorney, Agent, or Firm*—Bijan Tadayon (57) ABSTRACT

A new method and system are presented to drastically reduce the power absorbed by the body of the user's of mobile or wireless computing or communication devices, such as cell phones, so that the usage of those devices become safe for the users. In one case, multiple antennas are used, and the transmission is done in multiple steps or stages. The first antenna (the closest to the user) operates with extremely low power for short distances. In addition, the distance between the user and the last antenna is increased drastically. In another case, multiple frequencies are used, in combination with multiple antennas. The frequency chosen for the first antenna is selected from a range of frequencies corresponded to the low power absorption for a specific human tissue or for overall human body, as a weighted average. Other variations are also described in detail.

27 Claims, 4 Drawing Sheets

SAFE METHOD AND SYSTEM FOR MOBILE OR WIRELESS COMPUTING OR COMMUNICATION DEVICES

BACKGROUND OF THE INVENTION

Cellular phones have become very popular, not only for transmission of voice, but also for the transmission of text, data, and multimedia, converged to a form of a wireless PDA or a computer. In many parts of the world, cell phones and related technologies help people to become more mobile and resourceful. With ease of communication and speed and availability of data, all other industries, cultures, and most aspects of daily life have been influenced and drastically changed.

Despite the advantages of wireless, remote, or mobile communication and computation, one problem has not been solved yet. Because the wireless phones, pagers, radios, PDAs, gadgets, hand-held devices, appliances, or computers are in close proximity to the users' bodies, the radiated electromagnetic fields interact with nearby biological tissues. The antenna gain, radiation pattern, and input impedance are modified. In addition, the power absorption and signal blocking by human head, hand, and other parts of the body, with corresponding health concern and complications (such as brain cancer), require immediate solution and action by the hardware manufacturers, service providers, regulators, health organizations, consumer advocates, scientific communities, and government agencies around the world.

Jensen et al. studied the electromagnetic interaction of handset antennas and a human in personal communications (Proceedings of the IEEE, Vol. 83, No. 1, January 95, pages 7–17), with some suggestions for the design of the antennas. In addition, the same group and other researchers have studied the same subject extensively. For example, see the references cited in the Jensen et al.'s article (Proceedings of the IEEE, Vol. 83, No. 1, Janaury 95, pages 16–17). None of these references have a very effective solution for the radiation problem (absorption by user's body, and its health consequences, such as brain cancer).

U.S. Pat. Nos. 5,777,586, 5,666,125, and 5,507,012 (by Luxon et al.), U.S. Pat. No. 5,867,129, Khamis et al. (U.S. Pat. No. 5,930,729, for range extension accessory), and Matsumoto et al. (U.S. Pat. No. 5,949,377, for retractable, extendable, and rotatable dual antenna system, in which the second antenna is attached to the tip of the first antenna) deal with the antennas in various capacities. None of these patents have a very effective solution for the radiation problem.

Retractable antenna and rod-under-antenna have been suggested by various groups (to increase the distance between the antenna and the user), however, the antenna is still close to user's body. Thus, these are not effective solutions for the radiation problem.

Shielding devices are also used with the intention of reducing the radiation problem (such as the one offered by Marketing Future Inc.), and many patents have been issued for the design of antenna shield, such as U.S. Pat. Nos. 5,335,366, 4,471,493, 5,507,012, 5,666,125, 5,694,137, 5,564,085, 5,444,778, 5,541,609, 5,373,304, 5,336,896, 5,535,439, 5,657,386, 5,613,221, 5,726,383, 5,777,261, 5,777,586, 5,826,201, 5,940,039, 6,088,603, 6,095,820, 6,112,106, and 6,075,977. However, due to still close proximity of the antenna to the user's body, the radiation problem still exists. In addition, if the shield is misused or badly designed, in some situations (when the shield blocks the good reception for antenna), there could be an increase in bodily absorption of energy (because the cell phone increases its power output accordingly, to compensate for the bad or reduced reception). In summary, shielding is not an effective solution for the radiation problem.

Obviously, the farther away from the antenna, the less power absorption by the user's body (very roughly, goes by the ratio of square of distance values). In our current invention, we teach a new method and system to increase the distance between antenna and the user. However, let's look at the other related technologies, first.

Jabra EarBoom (by Jabra Corporation of San Diego, Calif., under U.S. Pat. No. 5,659,156, at Internet address: wwwjabra.com) offers an ear-piece (in combination with a microphone) which connects to the cell phone by a wire (connector), for hands-free mobility. This is also somewhat helpful to reduce the radiation absorbed by the user to some extent, by increasing the distance between the user and the antenna. However, to prevent the wire being entangled, they usually keep the length of the wire short. Therefore, the radiation problem still exists. In addition, having a short wire, the choices of positioning the handset is limited. If they had made the wire longer, then the wire would have been more likely to become entangled, effectively making the distance between the user and the antenna shorter again, which means more radiation absorption by the user's body. Furthermore, sometimes, when an entangled or a long wire accidentally gets yanked, the thin metal in the wire gets disconnected permanently, rendering the ear-piece useless. In short, the radiation problem is not effectively solved by this method, and this is not a convenient solution.

Other cellular headsets, such as over-the-head cellular headset (for example, Plantronics M110 and M114, sold by headsets.com), on-the-ear cellular headset, and in-the-ear cellular headset, have wire connections, and thus, have the same problems as those of Jabra EarBoom, mentioned above.

Similarly, PC headsets, such as Plantronics LS-1 Analog PC Headset, have wire connections, and thus, have the same problems as those of Jabra EarBoom, mentioned above.

Other corded headsets, such as GN Netcom Orator, Headsets.com Executive 2 Elite Over-the-Head, and Plantronics Mirage (H41), have wire connections, and thus, have the same problems as those of Jabra EarBoom, mentioned above.

Headsets.com (a headset specialist on the Internet) also sells a wireless headset called GN Netcom Bluetooth (GN 9010-BT), which lets the user roam around the office with the headset, free of any wiring or connection to the base or main part of the phone, for hands-free comfort and mobility in the office, using Bluetooth technology. The problem with this headset is that it only works with Bluetooth-enabled appliances, and within that (Bluetooth) environment (within a short range of distances). Thus, for example, the user can work in his office with other Bluetooth-enabled appliances, but the user cannot operate that in his car, in his house, or in the park, where other Bluetooth-enabled appliances are not available. In addition, the headset is intended to be used with a desktop phone. That is, according to the manufacturer's (GN Netcom) web site (gnnetcom.com), regarding the specification of GN 9010-BT complete unit, the unit consists of a headset and a base station, and the base station part of the unit is connected to a desktop phone. Thus, this is different from our current invention, which is intended for wireless or mobile environment.

Other wireless headsets (for example, by the manufacturers mentioned above, or HelloDirect.com, a division of GN Netcom), such as Plantronics CA10/CS10, Plantronics CT10, GN Netcom 2.4 GHz Ellipse, GN Netcom 9050, GN Netcom 9020-D, and GN Netcom GN 9000 Digital, are intended to work with a desktop phone, or have a hook-switch. Thus, this is different from our current invention, which is intended for wireless or mobile environment.

Some of the available commercial systems are useful for the mobile phone in the car, such as the antenna on the trunk of the car, or the systems that use the speakers of the radio, or use microphones attached to different parts of the car. One example is Tecno Vector (wireless infra-red full-duplex universal hands-free car kit), by TecnoZone Enterprises, LLC, sold through CompUSA store, or by tecnozone.com, which is designed for cell phones in cars. However, most of these systems are not practical for a user walking in the street, for example. Thus, one needs a more general or comprehensive solution, for any type of users, especially for mobile users.

Note that Logitech cordless telephone, PC, and VoIP headsets also have similar features as those of other manufacturers, described above. Thus, this is different from our current invention, which is intended for wireless or mobile environment.

Mobile computing products, such as PicoBlue Access Point for accessing the network via a Bluetooth-enabled device (offered by mobileplanet.com), have some of the same problems described above for GN Netcom Bluetooth (GN 9010-BT).

(Note that different kinds of hands-free speaker phones fall into one of the categories above. Thus, they have already been discussed in the previous paragraphs.)

Conventional (desktop) cordless phones, such as 2.4 GHz models by Panasonic, Siemens, Vtech, or Uniden (single-line or multi-line expandable), are also different from our current invention, because the base station itself is not wireless or mobile.

Conventional radios (or pagers) are also different from our current invention, because the radio is close to the user's body.

SUMMARY OF THE INVENTION

In this invention, a new method and system are presented to drastically reduce the power absorbed by the body of the user's of mobile or wireless computing or communication devices, such as cell phones, so that the usage of those devices become safe for the users.

In one embodiment, multiple antennas are used, and the transmission is done in multiple steps or stages. The first antenna (the closest to the user) operates with extremely low power for short distances. In addition, the distance between the user and the last antenna is increased drastically.

In one embodiment, multiple frequencies are used, in combination with multiple antennas. The frequency chosen for the first antenna is selected from a range of frequencies corresponded to the low power absorption for a specific human tissue or for overall human body, as a weighted average.

Other embodiments and variations/details are described below.

DETAILED DESCRIPTION OF THE PREFERRED EMBODIMENTS

In this invention, we are presenting a solution for any mobile/ wireless/ remote-access/satellite-access phone, cell phone, communication device, computation device, pager, radio, PDA, gadget, global positioning system, hand-held device, appliance, PC, computer, any one-way or two-way communication system, tracking device, broadcasting device, or narrowcasting device.

In our current invention, we teach a new method and system to increase the distance between antenna and the user, so that the radiation absorbed by the user is reduced drastically, to a safe level.

Figure 1:
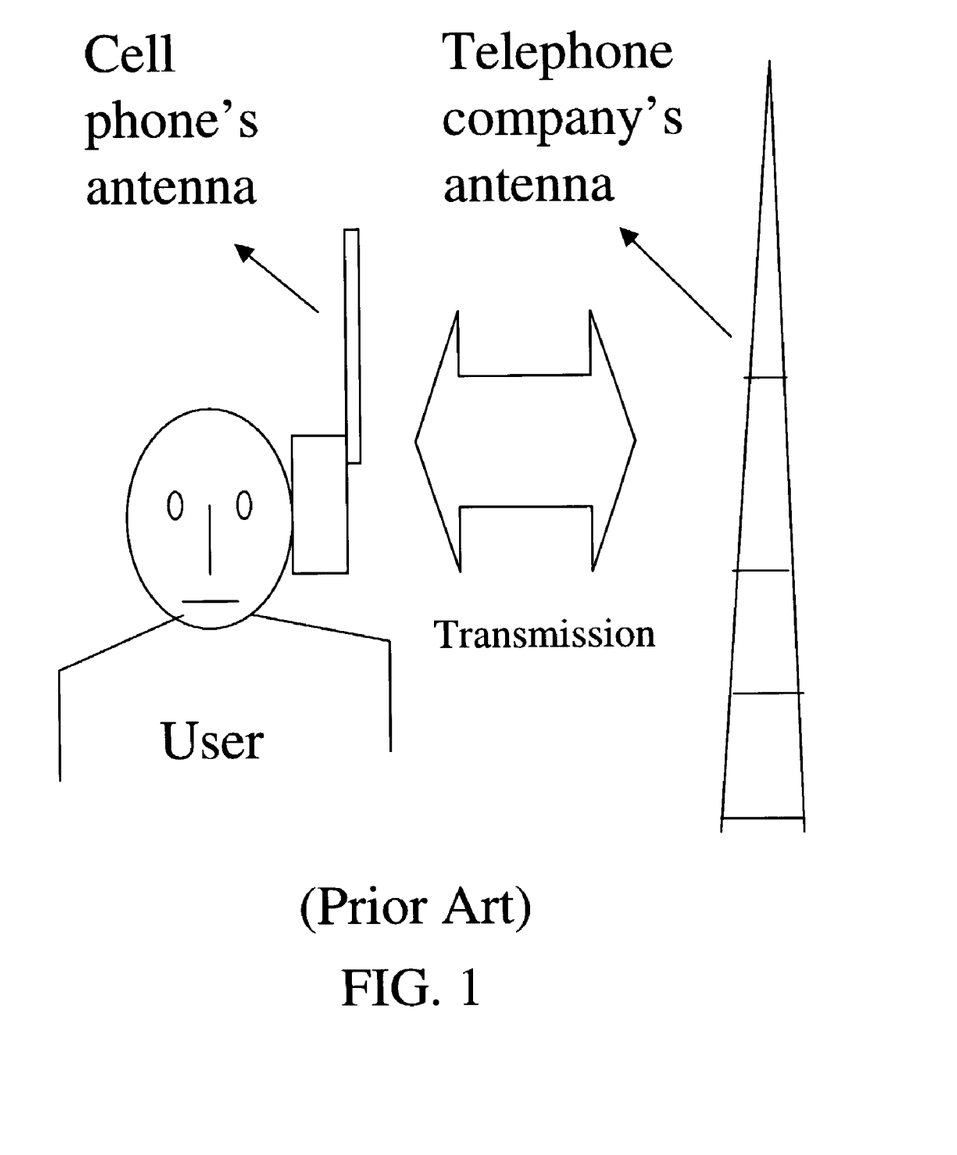
FIG. 1 shows a conventional cell phone transmission (Prior Art).
Figure 2:
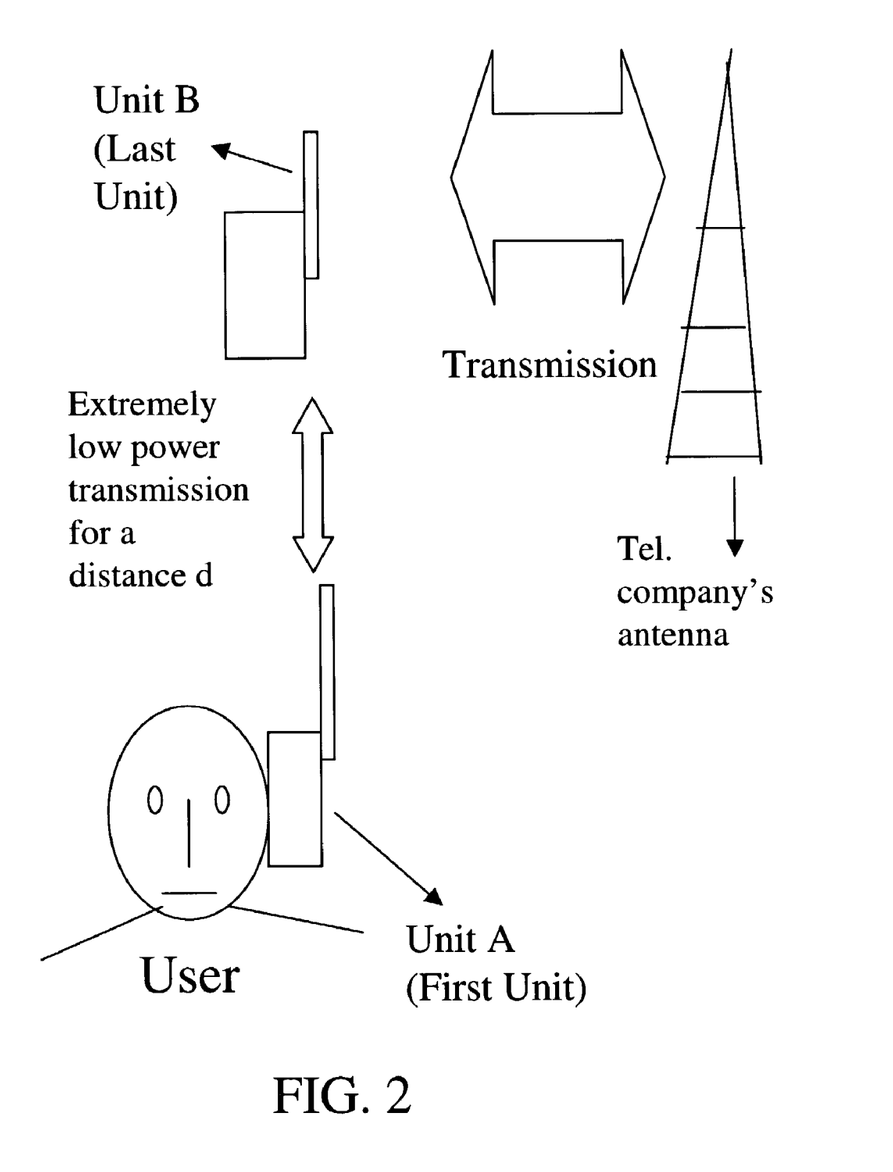
FIG. 2 shows a two-step transmission, according to one embodiment of the present invention.

In the conventional cell phone, for example, the antenna attached to the cell phone transmits the data directly to the cell with a relatively high power (see FIG. 1), and vice versa. In one embodiment of our system, this transmission occurs in two (or more) steps. For example, for a two-step case, between point A (unit A) and point B (unit B) (see FIG. 2), the transmission can be at a much lower power, for a shorter range (d) (for example, maximum range of 10 to 50 ft, only (instead of 1000–10000 ft, or more, for a conventional cell phone)). Therefore, the first antenna (unit A, which is close to the user) has an extremely low power, and does not harm the user. Then, the second antenna (unit B or last unit) transmits the data to the cell at a relatively high power (same power as a conventional cell phone). However, the distance between the user's body and the second antenna (unit B) (operating at a relatively high power) has been increased drastically (for example, from 0.5 inch increased to 10 ft or more). Thus, the power absorption by the user's body is decreased drastically (by many orders of magnitude), which means safe operation of cell phone for the user.

In one embodiment, this concept can be extended to multiple (in this case, more than 2) antennas. In one situation, all antennas are in a network, and cover an area. In another situation, the antennas are positioned in parallel, and transmit the data in parallel. In another situation, the antennas are positioned in series, for example, to extend the range of reception or to overcome a physical barrier, in which case the last antenna is the one sending the data to the cell or telephone center (see FIG. 3). In another situation, different power can be used for each part of the transmission. In another situation, the antennas are positioned star-shaped (with a central antenna) or in combination of parallel/in-series, for networking, security purposes, or having duplicate transmissions for accuracy or error-correction. In another situation, the antennas or one antenna can be shared by two or more users.

Figure 4:
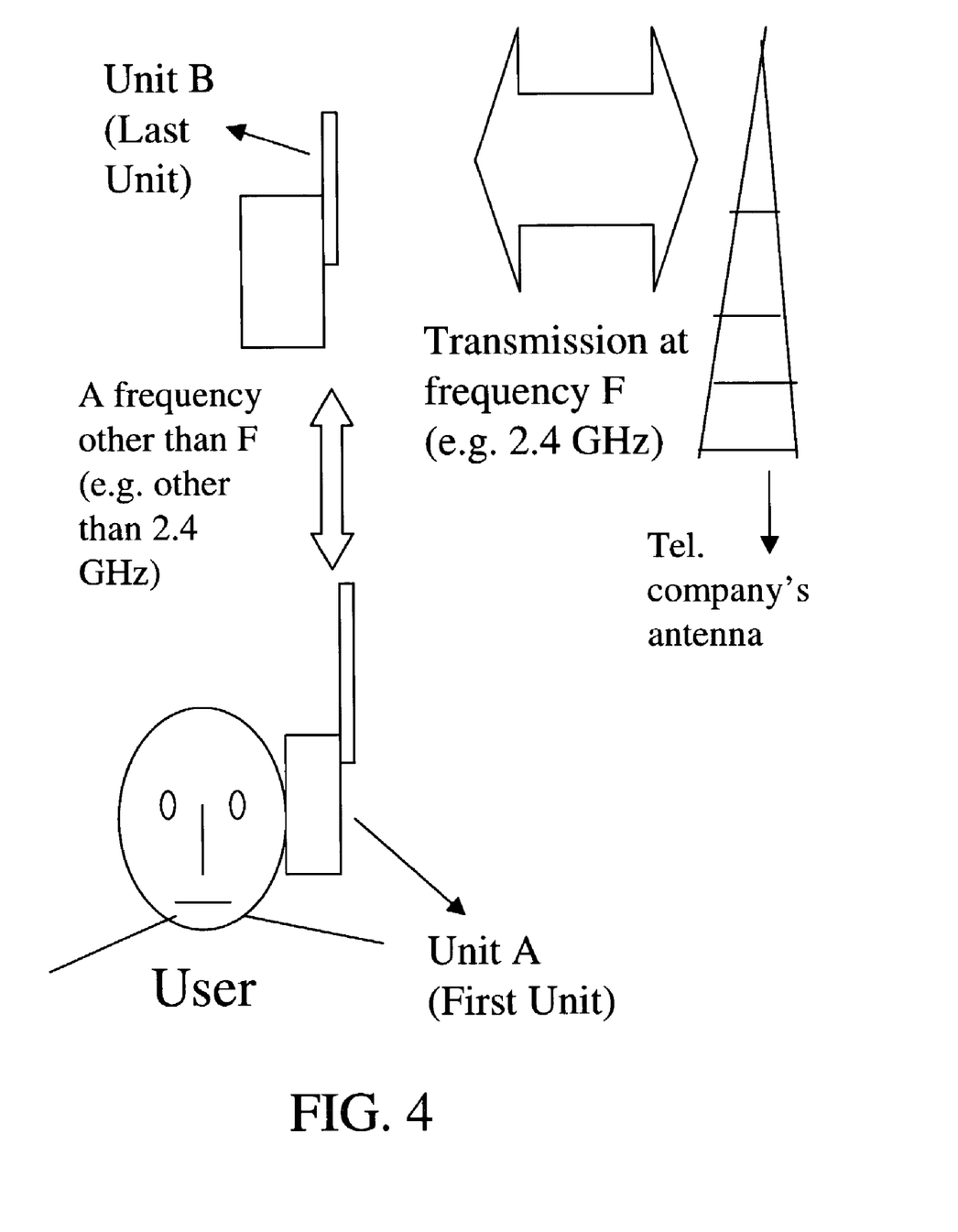
FIG. 4 shows using multiple frequencies for transmission, according to one embodiment of the present invention.

In another embodiment of the invention, the frequency or frequencies of the electromagnetic waves (used in the communication between the components and/or the cell) are chosen at different frequencies (or varied automatically, or changed by the user). The frequency can be chosen such that that frequency (or a window/range of frequencies) is away from the peak (or peaks) frequency (or resonant frequency) of power absorption by a specific (or all types of) human tissue (or tissues, such as brain or skin) (with respect to that frequency). That is, by using a different frequency (of low absorption) between unit A and unit B (for example) (see FIG. 4), near the user or users, the absorption is reduced drastically for the user. Chosen from the low absorption part of the frequency curve versus absorption (for different human tissues, or all tissues), this frequency is generally different from the main conventional frequency (which is used to communicate from the second or last antenna (unit B) to the cell, for example, at a range of 800 MHz–2.4 GHz, which is a frequency set by FCC, government agencies, or industry, and thus, the user has no immediate control over choosing that frequency).

Jensen et al. studied the electromagnetic interaction of handset antennas and human body parts and tissues (Proceedings of the IEEE, Vol. 83, No. 1, January 95, pages 7–17). Jensen et al. and its cited references are good examples that describe the power absorption of different tissues of human body or body parts, such as effects on hand and head, given a specific frequency. (There are many other biological studies with specific tables, curves, or numbers for absorption by different tissues or parts of body.)

Figure 3:
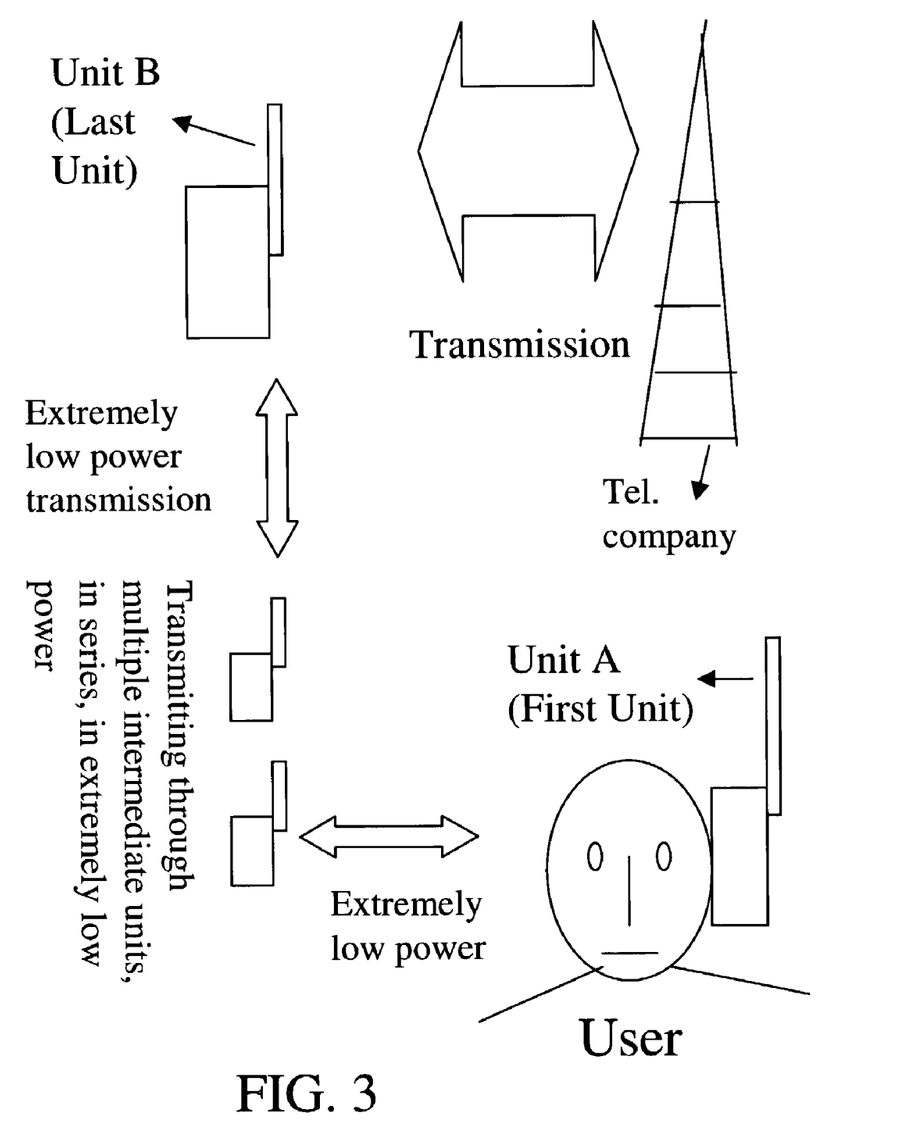
FIG. 3 shows the multiple antennas positioned in series, according to one embodiment of the present invention.

The concept of multiple frequencies can be combined with the concept of multiple antennas, described above. In addition, in multiple-step transmissions, some steps can be done with no antennas, and transmitted by other means, such as pulsed laser. Thus, the system can be hybrid and can have multiple stages or steps, as shown in FIG. 3, as a simple case of multiple antennas positioned in series.

In this invention, multiple frequencies can be used, therefore, the shields can be selected such that one frequency can be filtered, but not the others (selective shielding/filtering based on different frequencies and different materials).

The communication between antennas, components, or sub-systems can be in any form, such as wired, wireless, or any combination of those, using electromagnetic radiation of any wavelength (such as visible light, laser, invisible light, X-ray, ultra-violet, infra-red, or pulsed light) or any other types of data communication means (such as sound waves or magnetic), for any kind of information, data, or code (such as text, voice, music, financial information, computer codes, executable codes, multimedia, video, Morse codes, encrypted data, unencrypted data, compressed data, uncompressed data, computer commands, or fund transfers), with any kind of antennas (such as retractable, with extension, outside-of-the-housing, inside-of-housing, straight, curved, zigzag-patterned, square-patterned, circular-patterned, in array-form (multiple antennas), micro-antenna, on-substrate, on-chip, with spring-action, spiral/ring/coil-shaped, helical-shaped, dish-shaped, directional, non-directional, focused, multi-frequency, on-the-car, in-the-car, inside-the-glass, attached-to-a-balloon, on-a-helmet, on-a-watch, on-a-toy, on-a-robot, on-the-ear, in-the-ear, ear-piece, head-set, regular (conventional) handset, on-umbrella, on-eyeglasses (or their frames), on-another-antenna, inside-the-unit, hidden, or in (or on, or in the shape of) any one-dimensional, two-dimensional, and three-dimensional structures).

In one embodiment, the keypad, keyboard, number pad, mouse, speaker, microphone, display, LCD, or screen can be on unit A, unit B, or both. For ease of carrying, in another variation, unit A and unit B can be attached to each other by any means. In another variation, for mobile users, units A and B can be separately (or in combination) attached to the belt, briefcase, or purse of a user, using glue, mechanical, or magnetic means. In another variation, for security purposes, units A and B can be locked together, or locked to the belt/pants of the user. Alternatively, they can be equipped with password, PKI technology, or biometrics readers, to authenticate the user or users, if multiple users are allowed for the same unit. In another variation, to save space, unit A or B can be folded into another one. In another variation, the units can be placed in a steady position by suction method (establishing a partial vacuum), glue, special clothing, belt, screw, magnet, or nail.

In one embodiment, if the units A and B are attached or on the belt of the user, close to the user, the unit A and/or B can give a warning signals, such as a specific sound or LCD display, to remind the user to separate the units, and keep the unit B away from his body, at a distance. In another variation, each units or both can be disabled, until the separation of units occurs, to prevent the accidental usage. Once the units are separated, the units are operational, again. In another variation, this option can be turned off by the user. This can be software-based or switch-based. In another variation, the warnings are repeated every minute to remind the user, until the separation of units occurs. A sensor or a mechanical switch can be used to sense the position of units A and B with respect to each other, or with respect to the belt.

In another variation, the metallic casing or shielded housing of units A/B can be attached or connected to the user's belt, for better protection.

In one embodiment, for the case of multiple users, cell phones, and antennas, different units A and units B can be paired, using a code, ID number (set by manufacturer or at the time of sale, or selected by user later on), header, password, or special frequency. In another variation, they can be distinguished or found, using a matching sound or LCD display, or triggering a sound on unit B (using unit A). In another variation, unit A can work with any unit B (such as multiplexing). In another variation, it can be specifically paired to a unit B (plus using PKI, password, or biometrics), in which case, it can reduce the possibility of theft, because unit B without its corresponding unit A is useless.

In another variation, the frequencies used for short ranges (between units A and B) can be selected from a much bigger spectra of frequencies, because for short range and low power, the interference between neighboring users are negligible or zero, and FCC or others generally have less restricted rules for those situations.

In another embodiment, for public room, multiple users situation, a central B unit antenna can handle multiple users (multiple A units). In that case, directory, database, prioritization table, or a unique ID may be required. In another variation, a sensor can sense the presence of a new user in the public room or facility, or detecting the transfer or movement of the user from one facility/room to next, with possible sign-in and sign-out procedures for each room.

In another variation, the reverse can be done (multiple B units, and one A unit).

The current invention can be combined with voice recognition, voice commands, fuzzy logic/neural network (for pattern recognition/training, to authenticate the user), biometrics (such as iris, face, eye, nose, fingerprint, hand, or knuckle recognition, to authenticate the user), hands-free technology, encryption technology, authentication technology, compression technology, satellite technology, digital rights management technology, networking technology, broadcasting technology, and tamper-resistant technology.

For example, the current invention can be combined with Ultra-Wideband technology (for example, by XtremeSpectrum Corp. of Vienna) for transmission of signals between electronic devices at low power, WiFi technology (short for Wireless Fidelity) used to connect the computers to the Internet, and Bluetooth technology for linking various electronic devices together over short distances.

In another embodiment, for users with helmets, hats, or similar head coverings or protecting gears, one can add the metallic shield or other shielding material in the helmets, and put the antenna on top of the helmet. In addition, in another variation, a shell can be added on the helmet, so that the shell with the antenna can be separated from the actual underlying helmet, in order to put the antenna (located on top of the semi-sphere shaped shell) further away from the user's body, to reduce the radiation absorption by the user.

In one embodiment of the invention, for the wired ear-piece, the wire can be retracted into its housing (which can be attached or separate from the cell phone and/or antenna), using a spring or coil, a small motor, or manually by user.

In another variation, the retractable wire can be used for other sub-components, as well, for example, between units A and B, in addition to the communication by antenna, which gives the user two choices for communication between units A and B: by antenna or by wire. The user can select the desired means (depending on the situation), using a switch or menu on unit A.

Each unit can be separately-powered or centrally-powered. It can be with battery, solar-powered, rechargeable, directly-plugged-in, wind-powered, spring-powered, optically-powered, chemically-powered, remotely-powered, or nuclear-powered, using wire or wireless.

This can be for. digital or analog-communications.

In one embodiment, multiple antennas can be put on units A, B, or both, each for a different purpose or different frequency.

Another embodiment of the invention is to use a smaller cell size for cell phones (smaller geographical area per cell, in terms of square kilometers, for example). That reduces the power needed for transmission, thus, reducing power absorbed by the user, which is our goal here. However, to do this, there is more expense for the cell phone companies to set up the cell network, because they need more number of cells (in terms of number of cells per square kilometer, for example).

All of these mean extremely low or negligible absorption by the user's body, and thus, safe operation for the user. Thus, this invention benefits many industries, and drastically reduces the health risks for millions of users around the world.

Any other obvious variations or types of the features described above are also intended to be covered by the current invention and claims.

What I claim as my invention is:

1. A system for mobile or wireless communication or computation, said system comprising:
   first unit comprising first antenna, wherein said first unit is mobile or wireless;
   last unit comprising last antenna, wherein said last unit is mobile or wireless; and
   said first unit receives data from said last unit, wherein said data is transmitted from said last antenna to said first antenna,
   wherein said last unit receives said data from a location outside said system,
   wherein said data is transmitted from said location outside said system to said last antenna,
   wherein transmission of said data between said first antenna and said last antenna is done at first frequency, and
   transmission of said data between said last antenna and said location outside said system is done at second frequency,
   wherein said second frequency is different than said first frequency,
   wherein said first frequency is chosen from a range of frequency which corresponds to a low radiation power absorption for a specific tissue or part of human body, or which corresponds to a low overall radiation power absorption for whole body of a human or a specific animal, and
   wherein transmission of said data between said first antenna and said last antenna is done at first power, and
   transmission of said data between said last antenna and said location outside said system is done at second power, wherein said second power is different than said first power,
   wherein said second power is larger than said first power.

2. A system for mobile or wireless communication or computation, said system comprising:
   first unit comprising first antenna, wherein said first unit is mobile or wireless;
   last unit comprising last antenna, wherein said last unit is mobile or wireless; and
   said first unit transmits data to said last unit, wherein said data is transmitted from said first antenna to said last antenna,
   wherein said last unit transmits said data to a location outside said system,
   wherein said data is transmitted from said last antenna to said location outside said system,
   wherein transmission of said data between said first antenna and said last antenna is done at first frequency, and
   transmission of said data between said last antenna and said location outside said system is done at second frequency,
   wherein said second frequency is different than said first frequency,
   wherein said first frequency is chosen from a range of frequency which corresponds to a low radiation power absorption for a specific tissue or part of human body, or which corresponds to a low overall radiation power absorption for whole body of a human or a specific animal, and
   wherein transmission of said data between said first antenna and said last antenna is done at first power, and
   transmission of said data between said last antenna and said location outside said system is done at second power, wherein said second power is different than said first power,
   wherein said second power is larger than said first power.

3. A system as recited in claim 2, wherein the distance between said first unit and a user is shorter than the distance between said last unit and said user.

4. A system as recited in claim 2, wherein said system is used in a cellular, mobile, satellite-access, remote-access, or wireless phone.

5. A system as recited in claim 2, said system further comprising a radiation shield.

6. A system as recited in claim 2, wherein said first antenna, said last antenna, or both are retractable antennas.

7. A system as recited in claim 2, wherein said first antenna, said last antenna, or both are attached to or included in one of an ear-piece, a handset, or a headset.

8. A system as recited in claim 2, wherein said system is compatible with Bluetooth-enabled appliances or devices.

9. A system as recited in claim 2, wherein said system is used in a car.

10. A system as recited in claim 2, said system further comprising a hands-free device.

11. A system as recited in claim 2, wherein said system is used in at least one of computation device, pager, radio, PDA, computer-game device, e-book reader, music-player, video-player, rendering device, global positioning system, hand-held device, appliance, PC, computer, one-way or two-way communication system tracking device, broadcasting device, or narrow-casting device.

12. A system as recited in claim 2, wherein a third antenna is inserted between said first antenna and said last antenna, wherein said first antenna transmits said data to said third antenna, and said third antenna transmits said data to said last antenna.

13. A system as recited in claim 2, wherein N antennas are inserted between said first antenna and said last antenna, wherein said N antennas are positioned in series, and wherein N is an integer larger than 1.

14. A system as recited in claim 2, wherein N antennas are inserted between said first antenna and said last antenna, wherein said N antennas are positioned in parallel, and wherein N is an integer larger than 1.

15. A system as recited in claim 2, said system further comprising N other antennas,
   wherein said N other antennas transmit said data to a central antenna,
   wherein said central antenna transmits said data to at least one of said last antenna or said location outside said system, and
   wherein N is an integer larger than zero.

16. A system as recited in claim 2, wherein said second frequency is chosen from a range of 800 MHz–2.4 GHz.

17. A system as recited in claim 2, wherein said data consists of at least one of text, voice, music, financial information, computer codes, executable codes, multimedia, video, Morse codes, encrypted data, unencrypted data, compressed data, uncompressed data, computer commands, or fund transfers.

18. A system as recited in claim 2, wherein extra transmission steps are added between said first antenna and said last, wherein said extra transmission steps include at least a transmission done by a method other than using antenna.

19. A system as recited in claim 2, wherein said first antenna, said last antenna, or both are chosen from at least one of the types of with-extension, outside-of-the-housing, inside-of-housing, straight, curved, zigzag-patterned, square-patterned, circular-patterned, in array-form with multiple antennas, micro-antenna, on-substrate, on-chip, with spring-action, spiral-shaped, ring-shaped, coil-shaped helical-shaped, dish-shaped, directional, non-directional, focused, multi-frequency, on-the-car, in-the-car, inside-the-glass, attached-to-a-balloon, on-a-helmet, on-a-watch, on-a-toy, on-a-robot, on-the-ear, in-the-ear, on-umbrella, on-the belt, on-eyeglasses or on-their-frames, on-another-antenna, inside-the-unit, hidden, in any one-dimensional, two-dimensional, or three-dimensional structures, on any one-dimensional, two-dimensional, or three-dimensional structures, or in the shape of any one-dimensional, two-dimensional, or three-dimensional structures.

20. A system as recited in claim 2, wherein said first unit is attached to said last unit.

21. A system for mobile or wireless communication or computation, said system comprising:
   first unit comprising first antenna, wherein said first unit is mobile or wireless;
   last unit comprising last antenna, wherein said last unit is mobile or wireless; and
   said first unit transmits data to said last unit, wherein said data is transmitted from said first antenna to said last antenna,
   wherein said last unit transmits said data to a location outside said system,
   wherein said data is transmitted from said last antenna to said location outside said system,
   wherein said first unit is attached to one of the belt, purse, briefcase, jacket, clothing, or suitcase of a user,
   wherein said last unit is attached to said first unit, and
   wherein at the time of transmission, if said first unit is not separated from said last unit by a user, then said first unit, said last unit, or both warn said user, by means of at least one of sound or display.

22. A system as recited in claim 2, wherein said system further comprises at least two first units.

23. A system as recited in claim 2, wherein said system further comprises at least two last units.

24. A system as recited in claim 2, wherein said first unit, said last unit, or both include at least one of keypad, keyboard, number pad, mouse, speaker, microphone, display, LCD, or screen.

25. A system as recited in claim 2, said system further comprising a security module to authenticate a user or users.

26. A system as recited in claim 2, said system further comprising an anti-theft module to disable said system, whenever a user cannot produce a proper authorization for using said system.

27. A system as recited in claim 2, said system further comprising a wired ear-piece, wherein the wire of said wired ear-piece can be retracted into a housing.

* * * * *

INTER PARTES REEXAMINATION CERTIFICATE (1202nd)

United States Patent
Tehrani (10) Number: US 7,031,657 C1
(45) Certificate Issued: Nov. 9, 2015

(54) SAFE METHOD AND SYSTEM FOR MOBILE OR WIRELESS COMPUTING OR COMMUNICATION DEVICES

(75) Inventor: Mahin Nikmanesh Tehrani, Germantown, MD (US)

(73) Assignee: Saied Tadayon, Potomac, MD (US)

Reexamination Request:
No. 95/001,644, Jul. 15, 2011

Reexamination Certificate for:
Patent No.: 7,031,657
Issued: Apr. 18, 2006
Appl. No.: 10/235,567
Filed: Sep. 6, 2002

(51) Int. Cl.
*H04B 7/15* (2006.01)
*H04W 88/02* (2009.01)
*H04W 52/28* (2009.01)
*H04B 1/3827* (2015.01)

(52) U.S. Cl.
CPC .......... *H04W 88/02* (2013.01); *H04B 1/3838* (2013.01); *H04W 52/283* (2013.01); *Y02B 60/50* (2013.01)

(58) Field of Classification Search
None
See application file for complete search history.

(56) References Cited

To view the complete listing of prior art documents cited during the proceeding for Reexamination Control Number 95/001,644, please refer to the USPTO's public Patent Application Information Retrieval (PAIR) system under the Display References tab.

*Primary Examiner* — Minh Dieu Nguyen (57) ABSTRACT

A new method and system are presented to drastically reduce the power absorbed by the body of the user's of mobile or wireless computing or communication devices, such as cell phones, so that the usage of those devices become safe for the users. In one case, multiple antennas are used, and the transmission is done in multiple steps or stages. The first antenna (the closest to the user) operates with extremely low power for short distances. In addition, the distance between the user and the last antenna is increased drastically. In another case, multiple frequencies are used, in combination with multiple antennas. The frequency chosen for the first antenna is selected from a range of frequencies corresponded to the low power absorption for a specific human tissue or for overall human body, as a weighted average. Other variations are also described in detail.

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claim 21 is confirmed.

Claims 1-2, 11-15 and 25 are cancelled.

Claims 3-10, 16-20, 22-24 and 26-27 were not reexamined.

\* \* \* \* \*